(12) United States Patent
Rousseau

(10) Patent No.: US 8,651,050 B2
(45) Date of Patent: Feb. 18, 2014

(54) AUTOMATIC ANIMAL RETRIEVING PLATFORM ASSEMBLY

(75) Inventor: Léo Rousseau, Nicolet (CA)

(73) Assignee: Gestion Leo Rousseau, Nicolet (CA)

( * ) Notice: Subject to any disclaimer, the term of this patent is extended or adjusted under 35 U.S.C. 154(b) by 636 days.

(21) Appl. No.: 12/526,647

(22) PCT Filed: Feb. 8, 2008

(86) PCT No.: PCT/CA2008/000267
§ 371 (c)(1),
(2), (4) Date: Feb. 23, 2010

(87) PCT Pub. No.: WO2008/098354
PCT Pub. Date: Aug. 21, 2008

(65) Prior Publication Data
US 2010/0139568 A1    Jun. 10, 2010

(30) Foreign Application Priority Data

Feb. 13, 2007  (CA) .................................. 2578663

(51) Int. Cl.
*A01K 1/00* (2006.01)
*A01K 1/12* (2006.01)
(52) U.S. Cl.
USPC ......................... 119/14.04; 119/519
(58) Field of Classification Search
USPC .................. 119/14.04, 14.18, 516, 518–523
See application file for complete search history.

(56) References Cited

U.S. PATENT DOCUMENTS

| | | | | |
|---|---|---|---|---|
| 1,381,797 | A | * | 6/1921 | Caspers ...................... 119/840 |
| 3,759,225 | A | * | 9/1973 | Galbraith ................. 119/14.04 |
| 3,810,442 | A | * | 5/1974 | Jacobs et al. ............. 119/14.03 |
| 4,261,292 | A | * | 4/1981 | Le Du ...................... 119/14.04 |
| 4,323,033 | A | * | 4/1982 | Vosyka et al. ............ 119/14.04 |
| 4,470,372 | A | * | 9/1984 | Norman ...................... 119/524 |
| 4,813,379 | A | * | 3/1989 | Harmsen ..................... 119/840 |
| 5,469,808 | A | * | 11/1995 | Street et al. ................ 119/520 |
| 5,483,921 | A | * | 1/1996 | Waybright ............... 119/14.02 |
| 5,706,763 | A | * | 1/1998 | Trethewey .................. 119/737 |
| 5,979,365 | A | * | 11/1999 | Sorraghan et al. ........... 119/524 |
| 6,394,028 | B1 | | 5/2002 | Birk |

(Continued)

FOREIGN PATENT DOCUMENTS

CA     2434799     1/2004
CA     2484478     4/2005

*Primary Examiner* — David Parsley
(74) *Attorney, Agent, or Firm* — Norton Rose Fulbright Canada LLP

(57) ABSTRACT

An automatic animal retrieving platform assembly (10) and its method of operation for retrieving a domestic animal (12) from a stall (29) is described. The platform assembly retrieves and at least partly confines the domestic animal from a stall to effect a job function with the animal, such as for milking a cow in a dairy barn. The platform assembly (10) is displaceable on wheels (13) to position an entrance opening (24) thereof behind the animal stall. A displaceable floor (17) extends to the rear of the stall and retrieving arms (26, 27) are provided to grasp the animal and cause it to back-up slowly onto the displaceable floor where it is at least partly confined in a cage 18. After the job function is completed the retrieving arms (26, 27) release the animal and it returns freely to its stall. To help it return to its stall a tether (70) may be secured to a neck collar 30 of the animal.

24 Claims, 15 Drawing Sheets

(56) References Cited

U.S. PATENT DOCUMENTS

| | | | |
|---|---|---|---|
| 6,814,026 B2 | 11/2004 | Guo | |
| 7,086,348 B2 | 8/2006 | Guo | |
| 2006/0130777 A1 | 6/2006 | Adams et al. | |
| 2007/0017455 A1 | 1/2007 | De Vor | |

\* cited by examiner

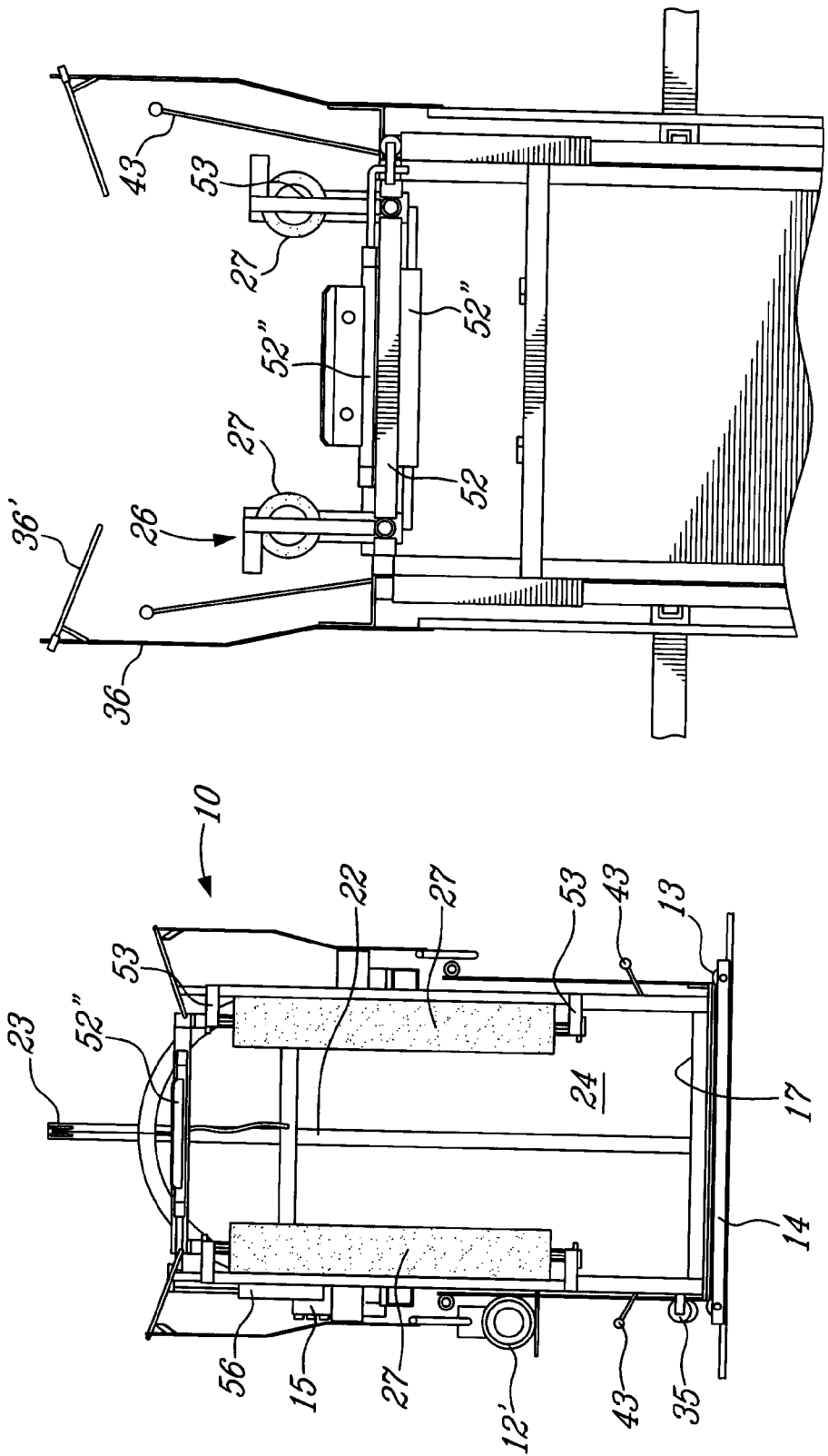

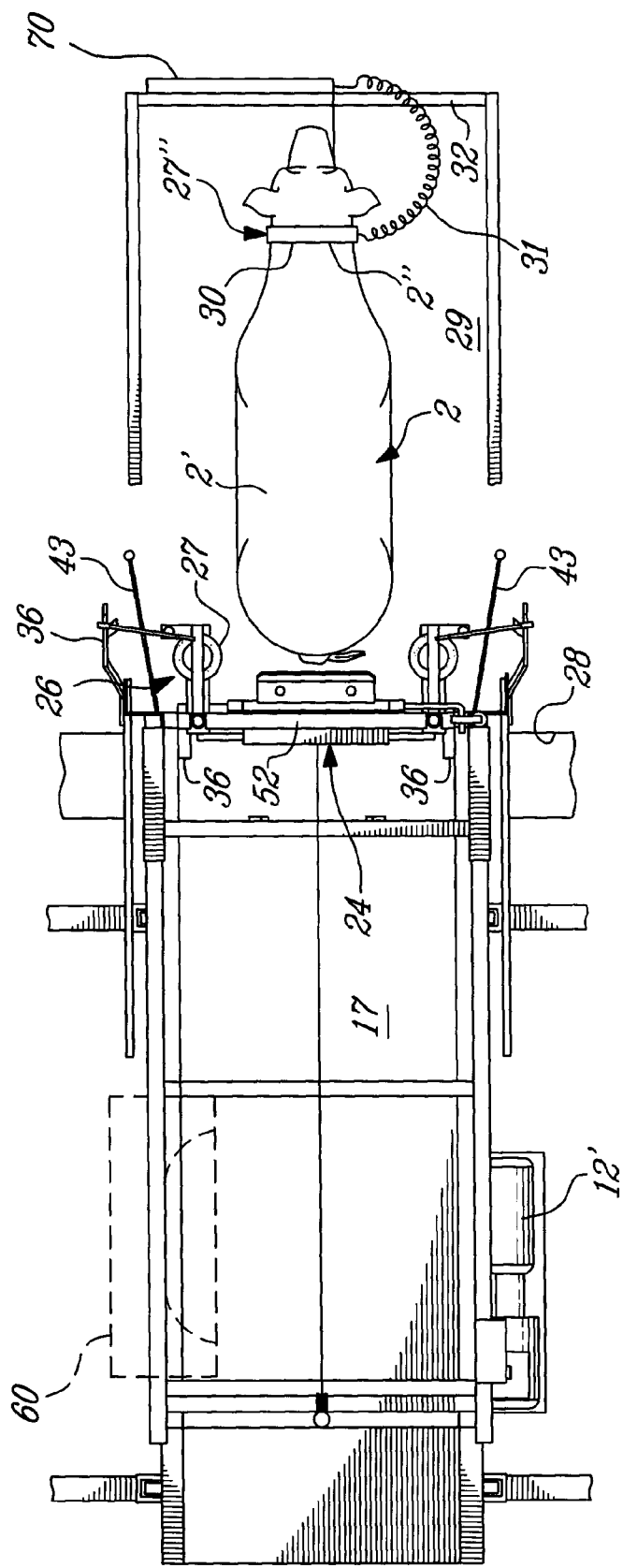

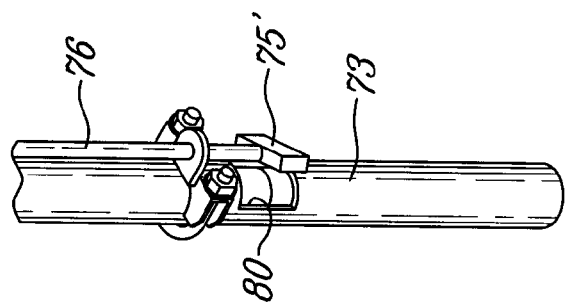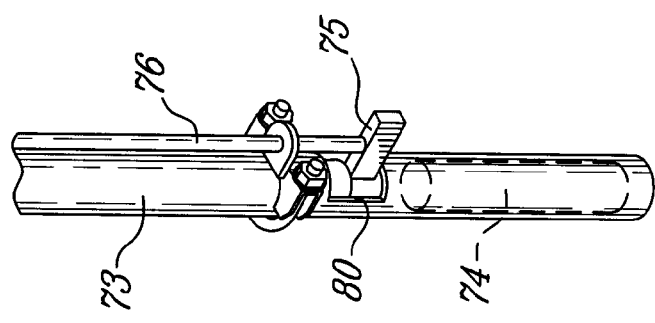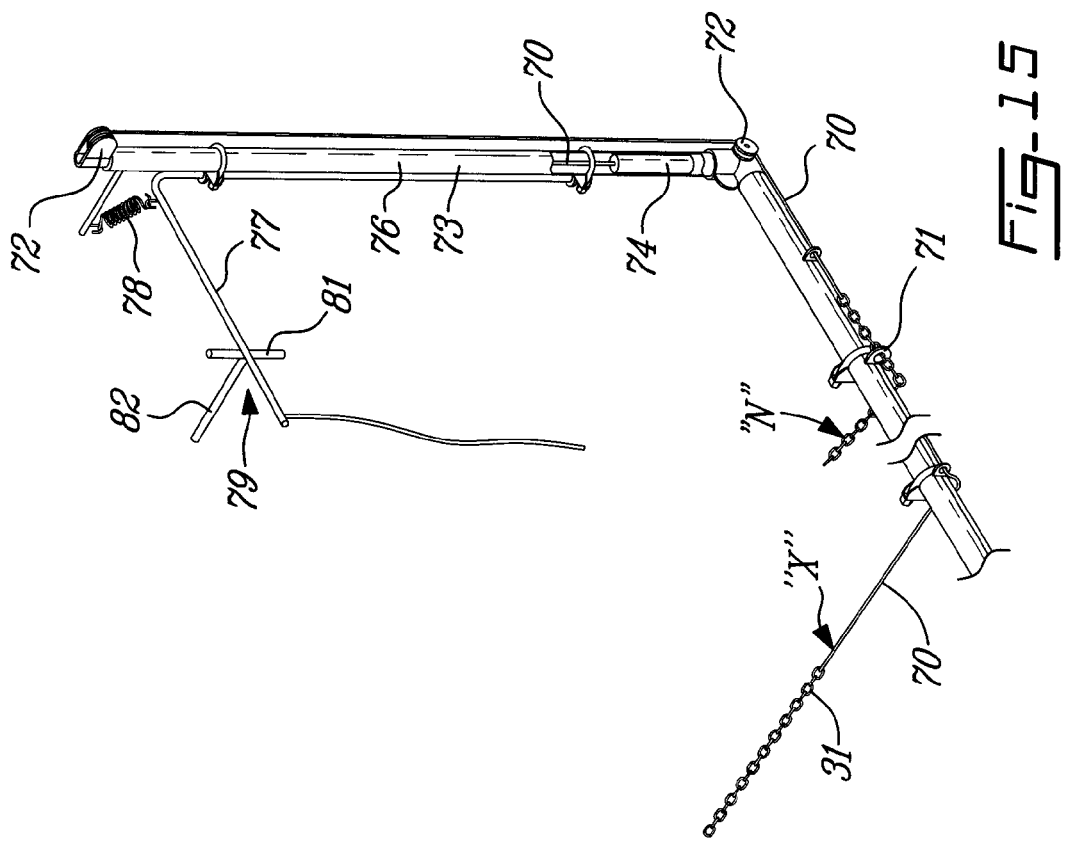

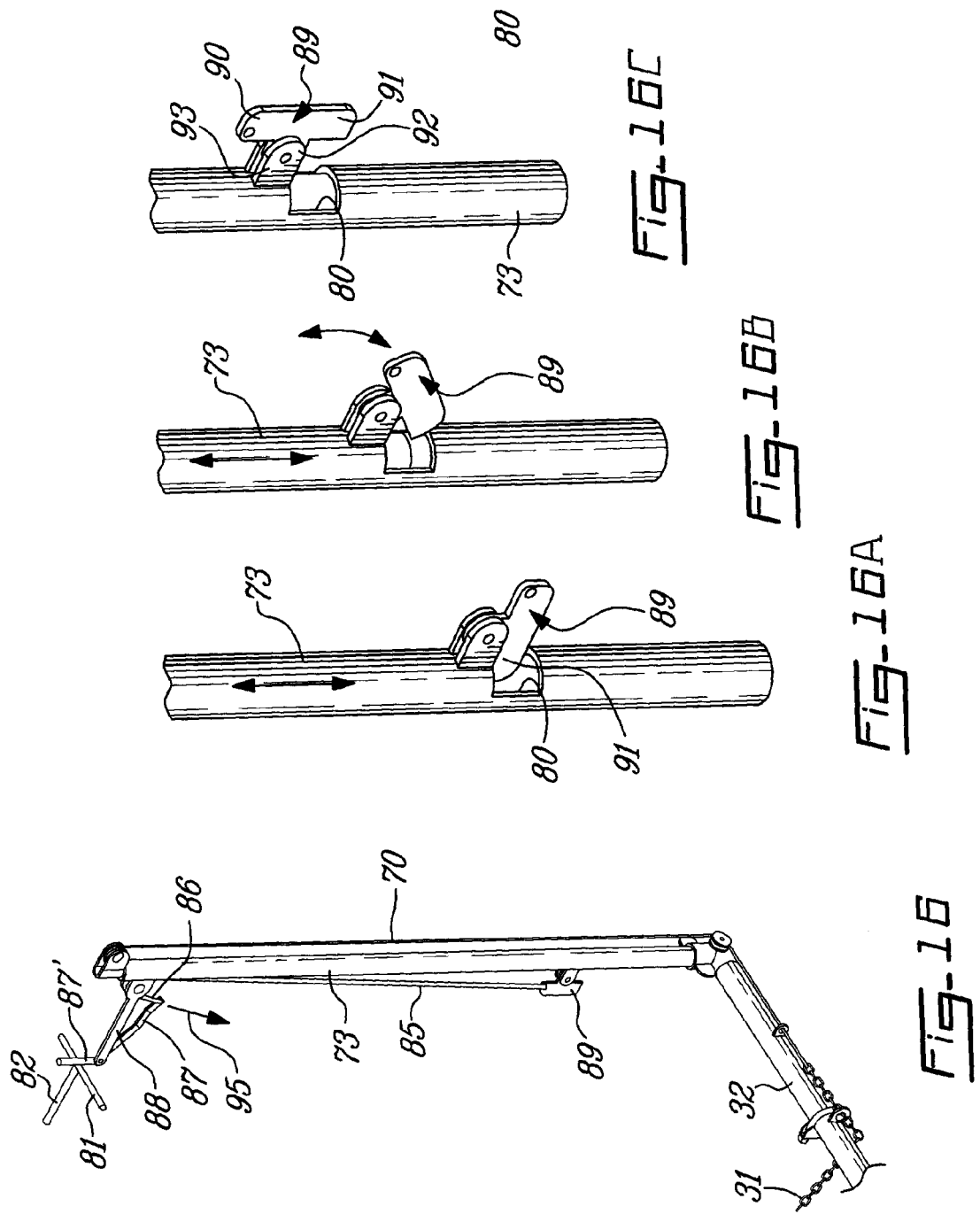

AUTOMATIC ANIMAL RETRIEVING PLATFORM ASSEMBLY

TECHNICAL FIELD

The present invention relates to an automatic animal retrieving platform assembly and method for retrieving a domestic animal fully or partly, from a stall to effect a job function to the animal. Particularly, but not exclusively, the domestic animal is a cow.

BACKGROUND ART

The raising of domestic animals and particularly cows is a very demanding task as the cows must be attended to on a daily basis for milking, cleaning and feeding. The milking is usually done early in the morning and late afternoon. Accordingly, a dairy farm having 100 or more cows results in a very labour-intensive business. Usually such dairy farms are operated by a family and because cows have to be attended to on a daily basis, as well as other chores associated with such a farm, the leisure activities of the family are quite restrained as one cannot leave a herd of cows unattended for long periods of time. A cow must be taken care of on a daily basis.

Modern machinery has been developed whereby to facilitate the milking of cows, the feeding and the cleaning of stalls. For example, automatic milking apparatus have been developed wherein a robotic arm is used for attaching a teat-cup to an animal's teat but labour is still required to herd the cows one-by-one into the apparatus and position the cow precisely therein. Although the milking is done automatically, such operation is often more labour-intensive in that the cows must be removed from their stalls, brought to the milking machine and then returned to the stalls. U.S. Pat. No. 6,394,028 is an example of such an automatic milking machine.

In order to alleviate the problem of shuttling the cows from their stalls to the milking apparatus, milking parlors have been developed and including a shuttle stall which loads an animal thereon, backs it up to a milking station, advances the cow out of the milking station and releases it in a release area wherein the cows then need to be brought to their stalls and repositioned therein or released outdoors to pasture. Again this is labour-intensive process as the cows must be herded or removed from the stalls and returned thereto. Also, the stall arrangements often create traffic jams as the cows must be displaced in front of shuttle stalls which are occupied during the milking process. It is also manually required to position the cow on the shuttle stalls and secure it thereon by operating displaceable gates. These shuttle stalls only move from a loading position to a milking position and then are unloaded when the stall is brought back to the loading position. The stall moves forward and backward along a straight axis, as disclosed in U.S. Pat. No. 6,814,026. Another milking parlor arrangement is described in U.S. Pat. No. 7,086,348.

The above-referred to prior art are examples of the progress being made to try to automate a milking farm in an attempt to reduce the job functions of its operators. However, these modern machines and systems still require too much labour as the cows still need the human element to herd them in groups to these machines which means releasing them from their private stalls during winter months and then bringing them back to their stalls and attaching them therein.

DISCLOSURE OF INVENTION

It is a feature of the present invention to provide an automatic animal retrieving platform assembly which substantially overcomes the above-mentioned disadvantages of the above-described prior art.

Another feature of the present invention is to provide an automatic animal retrieving platform assembly for retrieving and confining a domestic animal, such as a cow, from a stall to effect an automatic job function with the animal and then releasing the animal back in the stall without human intervention or with the human intervention being minimal.

Another feature of the present invention is to provide an automatic animal retrieving platform assembly for retrieving and confining a domestic animal to effect a job function which can be one of milking the domestic animal, transporting the domestic animal to another location, conditioning the hoofs of the animal, causing the animal to exercise or to effect a medical treatment to the animal for its well being.

Another feature of the present invention is to provide for a well cared cow which in return will provide more milk and live a longer life thereby providing a better return on the investment to its owner.

Another feature of the present invention is to provide an automatic animal retrieving platform assembly for retrieving and confining a domestic animal from a stall to effect a job function with the animal without human intervention.

Another feature of the present invention is to provide a method of automatically retrieving a domestic animal from a stall to effect a job function to the domestic animal.

According to the above features, from a broad aspect, the present invention provides an automatic animal retrieving platform assembly for retrieving and at least partly confining a domestic animal from a stall to effect a job function to the animal. The platform assembly is displaced by motorized means along guide means. The platform assembly has a floor and confining means above the floor to receive at least a rear portion of the domestic animal. An entrance opening is associated with the confining means. Extendible retrieving means is provided on opposed sides of the entrance opening and dimensioned to be extended on a respective side of a domestic animal occupying a stall with the entrance opening facing a rear open end of the stall. The extendible retrieving means is spaced apart to confine the domestic animal therebetween while permitting self-motion of the animal therebetween. Each of the extendible retrieving means has body contact means to engage a frontal body portion of the domestic animal from opposed sides thereof and to apply a retrieving force on the animal when the extendible retrieving means are retrieved in unison to cause the domestic animal to slowly back-up onto the floor and be at least partly confined by the confining means. Means is also provided to cause the animal to exit the platform assembly through the entrance opening.

According to a further broad aspect of the present invention there is provided an automatic animal retrieving platform assembly for automatically retrieving and at least partly confining a domestic animal from a stall to effect a job function to the animal while at least partly confined on the animal retrieving platform. The platform assembly is automatically displaced by platform displacing motorized means and platform guide means and arrested to a location behind the stall. The platform assembly has animal confining means to receive at least a rear portion of the domestic animal. An opening is associated with the animal confining means. Extendible animal retrieving means is secured to the animal retrieving platform and dimensioned to be extended in relation to the domestic animal occupying a stall with the opening facing a rear open end of the stall and the rear portion of the domestic animal. The extendible animal retrieving means confines and contacts a body portion of the domestic animal while permitting self-motion of the animal. The extendible animal retrieving means applies a retrieving force on the domestic animal to cause the domestic animal to slowly back-up into the opening and be at least partly confined by the animal confining means. The animal retrieving platform remains arrested behind the stall until the job function is completed on the animal retrieving platform and the animal has returned to the stall.

BRIEF DESCRIPTION OF THE DRAWINGS

A preferred embodiment of the present invention will now be described with reference to the accompanying drawings in which:

FIG. 2 is a front view of the animal retrieving platform assembly showing the entrance opening and associated structures of the animal retrieving mechanism;

FIG. 3 is a top view of the front end of the animal retrieving platform assembly illustrating the position of the animal retrieving mechanism in a retracted position and its relationship to the side restraining arms;

FIG. 4 is a top view of the animal retrieving platform assembly showing its position behind the rear end of a stall containing a cow to be retrieved therein;

FIG. 15 is a perspective view of one version of an extendible tether mechanism to be used with the automatic animal retrieving platform assembly of FIGS. 1 to 10;

FIGS. 15A and 15B are perspective views showing the operation of the arresting finger element which prevents the tether from being extended and which releases the tether;

FIG. 16 is a perspective view of a further embodiment of the extendible tether;

FIGS. 16A to 16C are perspective views showing the operation of a different arresting finger element design to prevent the tether from being extended and to release the tether to provide extension thereof.

MODES FOR CARRYING OUT THE INVENTION

Figure 1:
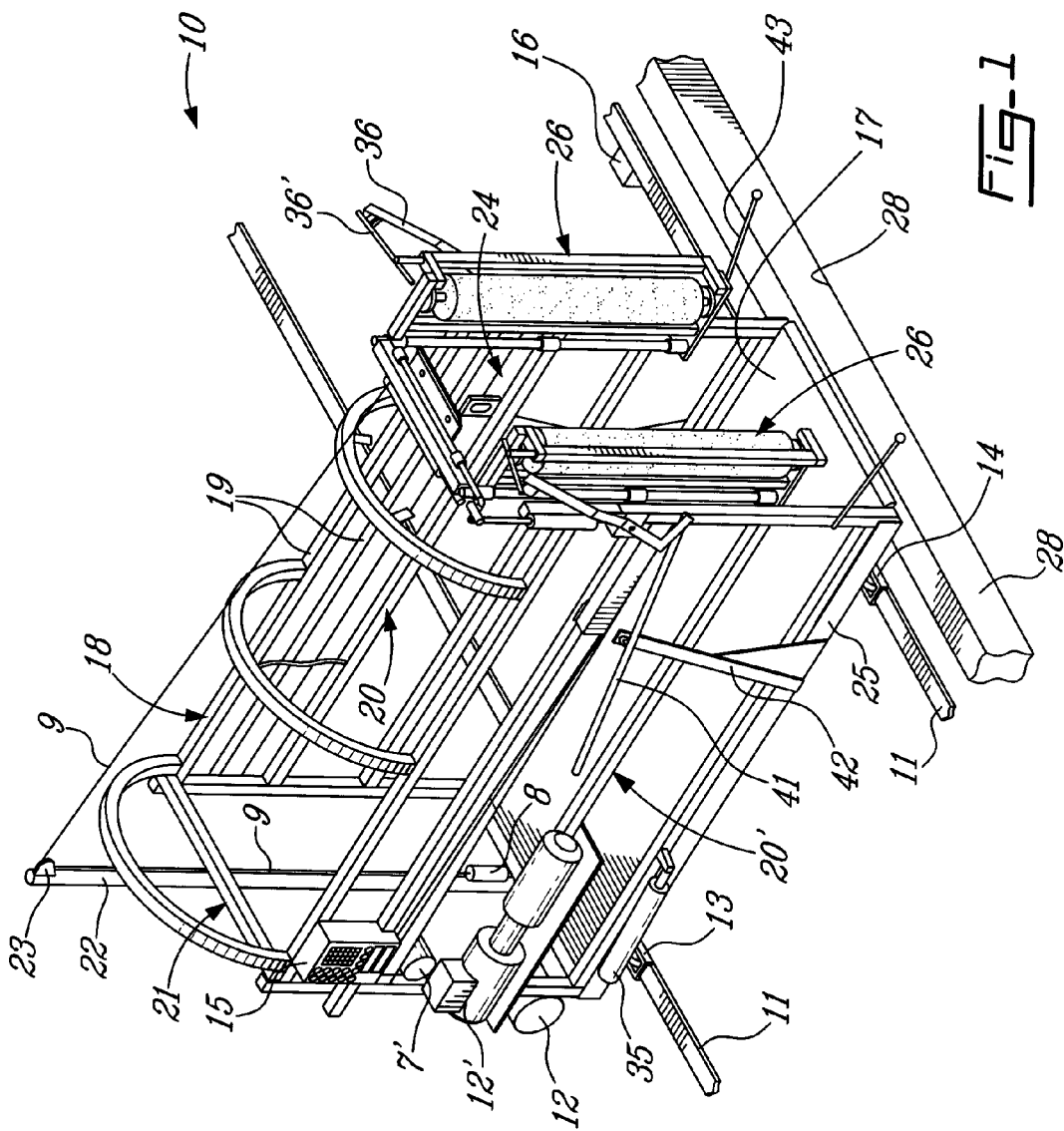
FIG. 1 is a perspective view of a first embodiment of the automatic animal retrieving platform assembly of the present invention.
Figure 10:
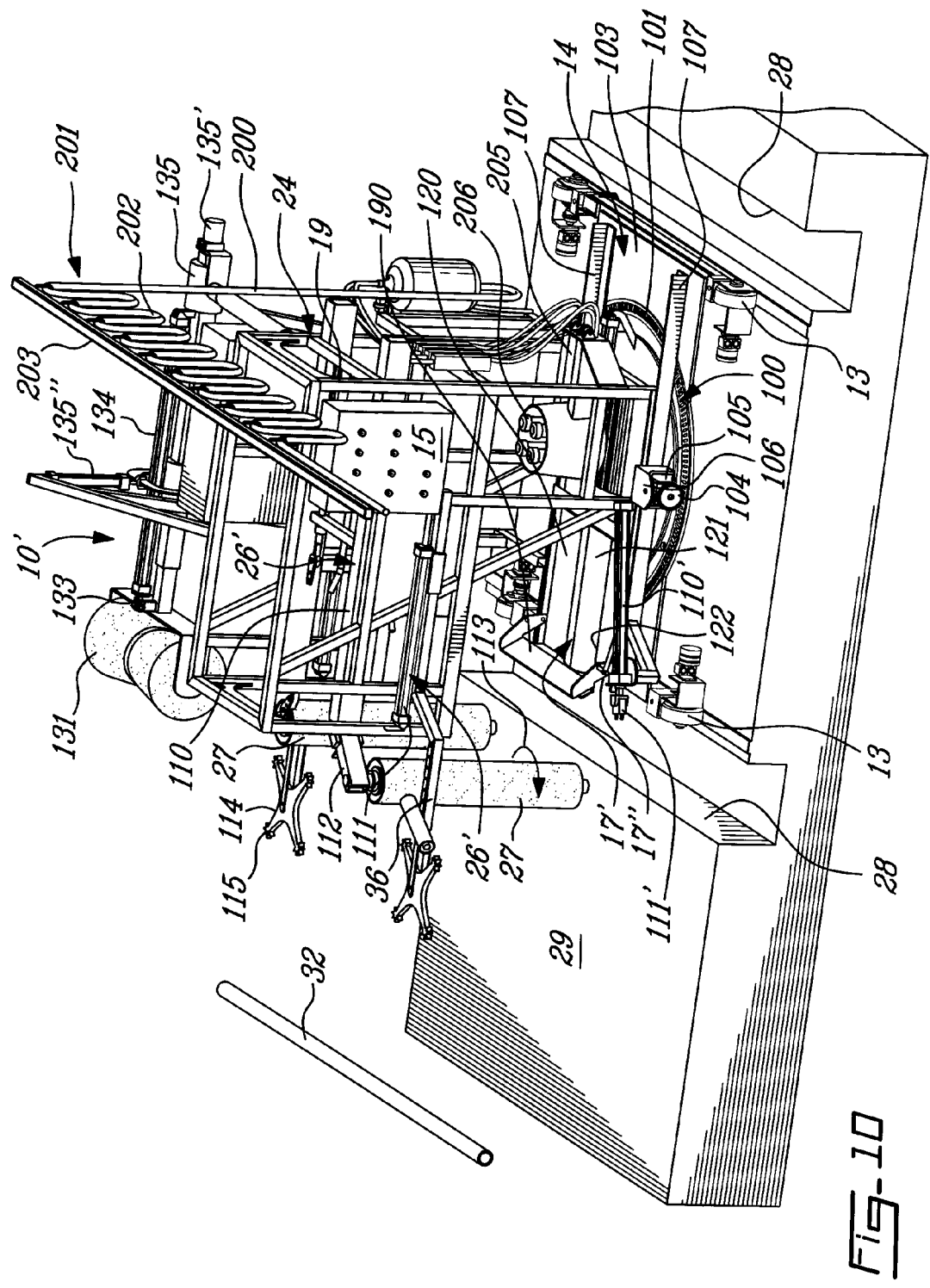
FIG. 10 is a side perspective view of a second embodiment of the automatic animal retrieving platform assembly of the present invention wherein a turret pivoting mechanism is secured under the floor frame and wherein the floor is modified to receive a rear end portion only of the animal and further wherein an exercising platform and brushing assembly is secured to a side of the platform.

Referring now to the drawings and more particularly to FIG. 1 there is shown generally at 10 one embodiment of the automatic animal retrieving platform assembly of the present invention. This assembly was developed whereby to retrieve and confine a domestic animal, such as a cow, from a stall to effect a job function with the animal without human intervention. FIG. 10 shows a further version of the automatic animal retrieving platform assembly 10' wherein the animal is only partly confined within the platform assembly.

The platform assemblies 10 and 10' are herein shown as being displaced on a pair of tracks 11 by motorized means such as an electric motor 12 which drives support wheels 13 mounted on an undercarriage 14 of a support frame (not shown). However, it is pointed out that other forms of displaceable guide means is contemplated such as a motorized wheel platform guided by a wire and/or electronic sensors to displace and locate the platform assembly at precise locations. Accordingly, the animal retrieving platform assemblies 10 and 10' are displaceable along the tracks 11 to various locations automatically by a computer-controlled controller device 15 associated with location sensors 16 and other sensors (not shown) but obvious to a person skilled in the art. The controller 15 can be programmed to position the animal retrieving platform assembly 10 at any predetermined position along the tracks 11. Hydraulic motor 12' provides the hydraulics to the piston cylinders. The controller 15 can be remotely located and interfaced with a PC 15' as will be described later with reference to FIG. 17.

Referring to the embodiment of FIGS. 1 to 9, the animal retrieving platform assembly 10 is provided with a displaceable floor 17 as well as an animal confining means or structure in the form of a cage 18. The cage 18 is constructed of metal bars 19 and defines opposed side walls 20 and 20' and an end wall 21. The end wall 21 is hereinshown with a vertical post 22 having a pulley support 23 at a top end thereof to support a pressure actuating cable 9 secured to an adjustable weight 8 at a lower end thereof whereby to bias animal body contacting cylindrical rollers 27 against a cow positioned standing in its stall, as will be described later. This pressure should be comfortable to the animal while being capable of providing guiding displacement of the animal.

An entrance opening 24 is provided at the front end of the cage. As hereinshown the cage 18 is secured to the displaceable floor 17. However, it is conceivable that the cage 19 could be secured to the floor structure 25. Also, the displaceable floor 17 could be positioned under a solid floor platform whereby to position a domestic animal inside the cage 18 on the floor structure 14 without having to retract the displaceable floor 17 as will be described later. The floor 17 could also be a stationary floor with a hinged or pivotal or telescopic floor plate at a front end thereof to bridge a gutter 28 usually located behind the stalls of cows in a dairy barn, whereby to provide access to the cage.

As shown in FIGS. 1 to 8, an extendible retrieving mechanism 26 is provided on opposed sides of the entrance opening 24 and is dimensioned to be extended on a respective side of a domestic animal, herein the cow 2, as illustrated in FIG. 4. The extendible retrieving mechanism 26 is provided with body contact means in the form of cylindrical rollers 27 constructed of soft foamy material to automatically engage the body 2' of the cow 2 from opposed sides thereof at approximately mid-body and to move up to the neck area 2" of the cow 2 while a lateral pressure of about 30 lbs is maintained on the animal by the weight 8 which biases the roller support fame 53 inwardly towards each other. When these cylindrical rollers reach the neck area 2" of the cow, the cow is centered with the entrance opening and pressure is maintained and the cylinders are retracted slowly. This causes the domestic animal to slowly back-up onto the displaceable floor 17 which has been extended over a gutter 28 behind the stall 29 where the cow is confined. The cable 9 has a length selected to pull the weight 8 only when the rollers 27 are at about mid-stomach of the cow and until then the cable is loose. This distance is about 3½ feet from the end of the extended floor 17. The cable force contracts the torsion spring 27" which maintains the rollers 27 open. Cylinders, as illustrated in FIG. 10, instead of a cable and weight system may be used to effect the displacement of the rollers 27 and the application of a restraining force thereon.

As herein shown the cow 2 is provided with a neck collar 30 having a chain 31 secured thereto and engaging a front metal rod 32 of the stall. A retractable tether is connected to the chain 31 to cause the animal to back-up and to return to the stall as will be described later with respect to this embodiment.

In operation the animal retrieving platform assembly 10 is displaced automatically by a controller 15 along the tracks 11 and stops behind a rear end of a stall 29, as shown in FIG. 4. The displaceable floor 17 is then extended by a floor actuating cylinder 35 whereby to project the front end portion of the displaceable floor 17 over the gutter 28 disposed behind the stall. A sensor 36 or other detection means instructs the controller 15 when to stop the cylinder 35. Should there be an obstruction such as a leg of the cow placed between the front edge of the displaceable floor and gutter, the floor drive will stop automatically.

Figure 5:
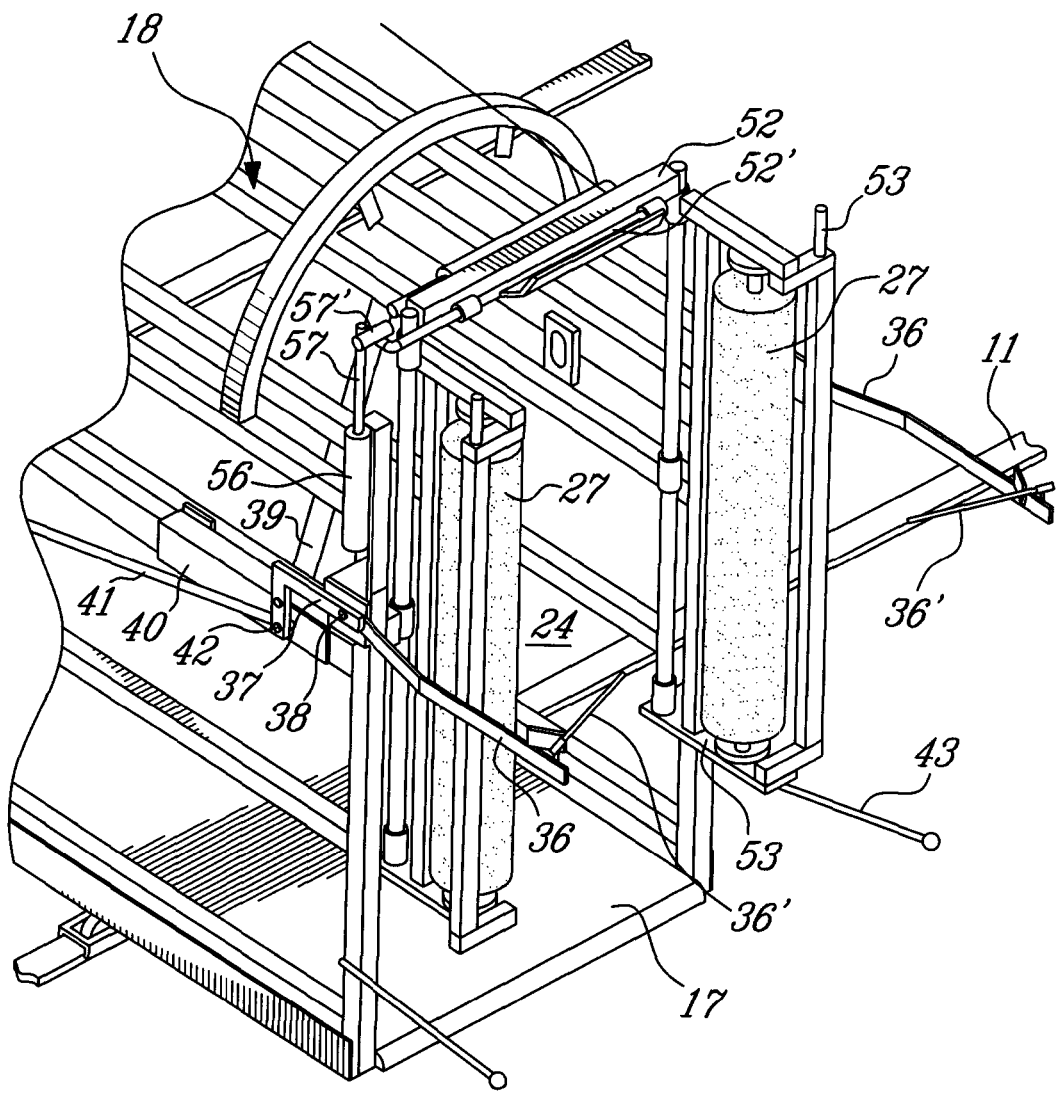
FIG. 5 is a perspective view of the front end of the animal retrieving platform assembly showing the relationship of its different mechanisms relative to the entrance openings.
Figure 6:
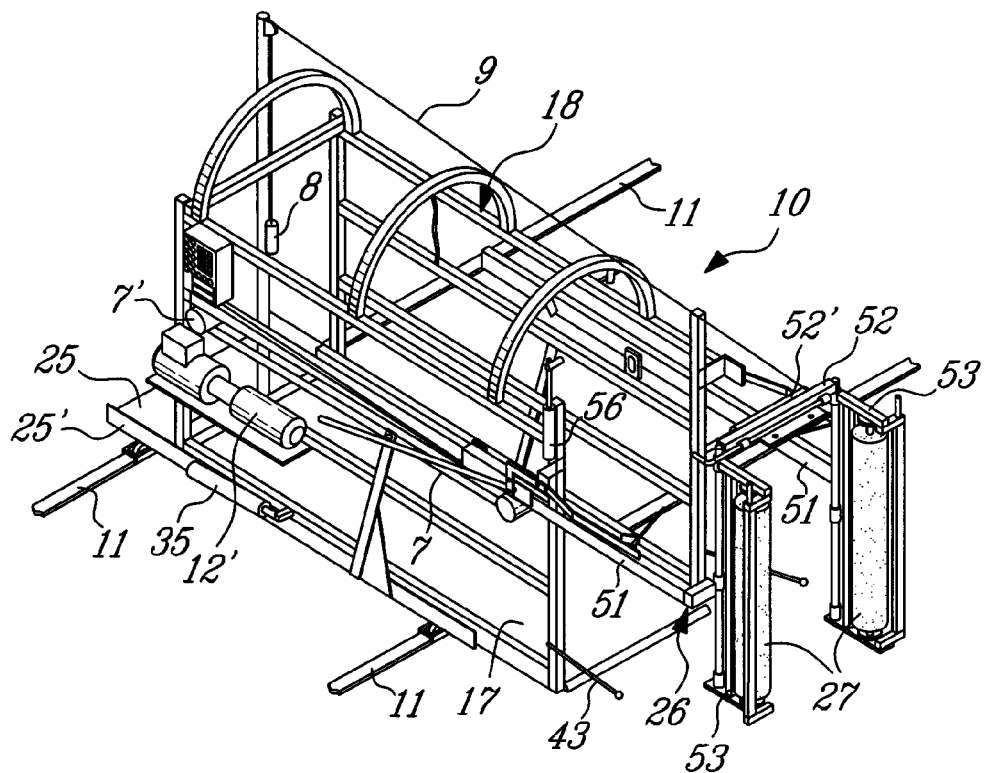
FIG. 6 is a perspective view showing the displaceable floor and its confining cage in an extended position and with the extendible retrieving arms partly extended.

As shown in FIG. 6, the displaceable floor 17 is a rectangular floor which is supported on the floor panel structure 25 provided with opposed side flanges 25'. For smooth operation, the displaceable floor 17 may be provided with rollers or wheels intermediate the underside thereof and the floor structure 25. With additional reference to FIG. 5 there is also shown an animal confining structure which is constituted by guide arms 36 which are secured elevated on opposed sides of the cage adjacent the entrance opening when the displaceable floor is in a retracted position. The guide arms 36 are automatically actuated from a retracted raised position, as shown in FIG. 1, to a horizontal position of use as shown in FIG. 5 by the displacement of the displaceable floor. These guide arms 36 are provided with flexible rods 36' which contact the rear body portion of the cow as it descends whereby to cause the cow to position itself in line with the entrance opening 24. This guide assembly is modified in FIG. 10.

As shown in FIG. 5, the side arms are connected to an L-shape bracket 37 which has a pivot 38 secured to a connecting bracket 39 welded on a displaceable sleeve 40 which moves with the displaceable floor 17. As the floor advances the link arm 41 pulls on the actuating end 42 of the L-shaped bracket causing the arms 36 to move down to a horizontal position. When the displaceable floor 17 is retracted the opposite is repeated and the guide arms 36 swing upwardly to its stored position, as shown in FIG. 1. The link arm 41 is connected to a support post 42 which is immovably secured to the floor structure 25, as better shown in FIG. 1. The animal confining means may also include a pair of lower flexible side rods 43 to cause the cow to maintain its position if by chance it should deviate from the longitudinal axis of the displaceable floor when backing up thereon. After the cow 2 has familiarized itself with the retrieving mechanism and its function, it will instinctively back up on the platform and return to its stall.

Figure 7:
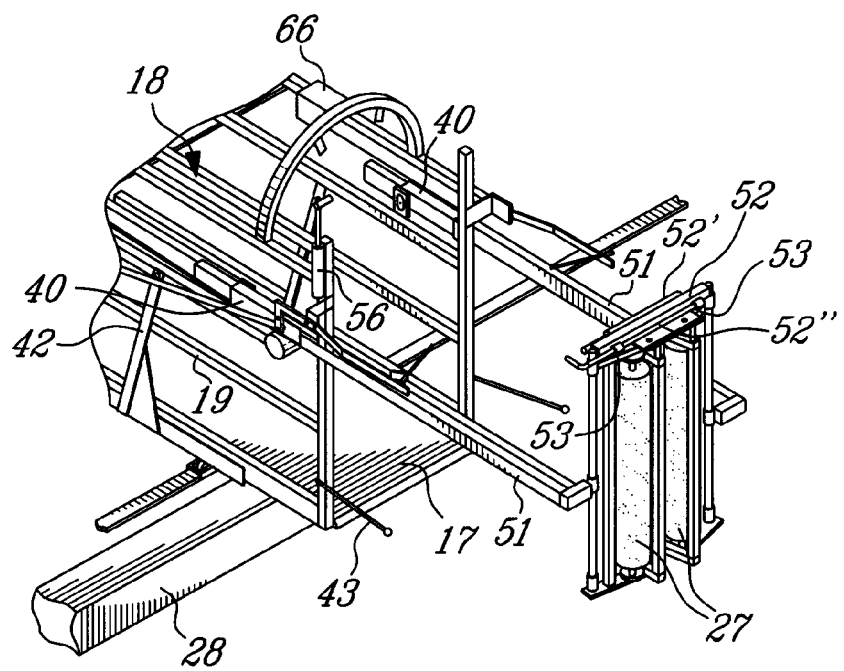
FIG. 7 is a perspective view, similar to FIG. 6, of the front end only of the animal retrieving platform assembly showing the extendible retrieving arms fully extended with the body contact rollers of the retrieving means in an actuated closed position.
Figure 8:
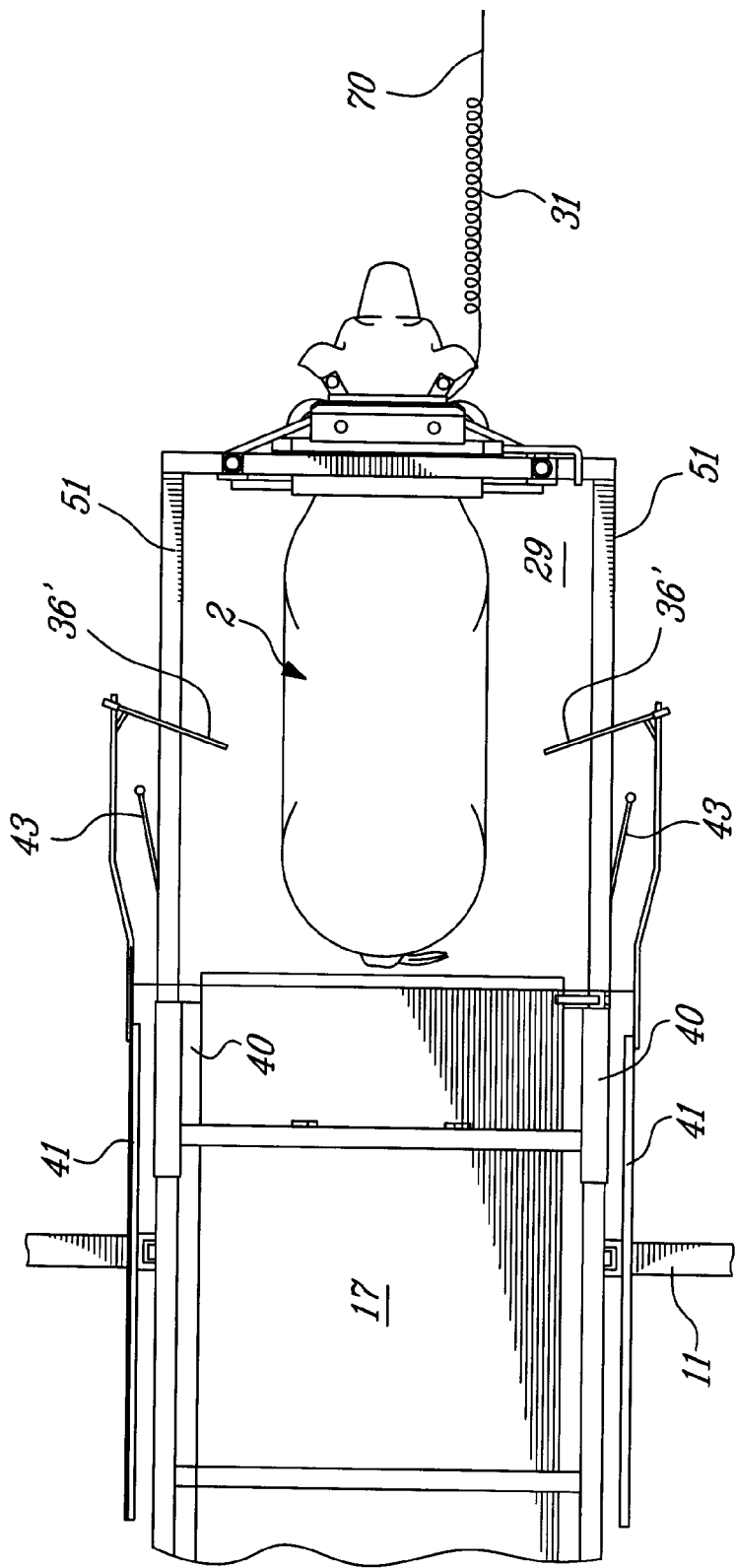
FIG. 8 is a top view of a front end portion of the animal retrieving platform assembly showing the body contact cylinders engaged with the neck area of a cow in a position ready to be retrieve the retrieving arms whereby to cause the cow to slowly back-up onto the displaceable floor.

Referring now to FIGS. 5 to 7, there will be described the construction of the extendable retrieving means. It is comprised of a support frame 50 which is secured to a pair of telescopic rods 51 which are supported in a respective one of sleeves 40 secured to the bars 19 of the cage. An endless chain 7 is secured to both sides of the frame and each driven by a motor 7', only one shown herein for clarity. The motors 7' are driven in synchronism and the chain is coupled to the telescopic rod 51 to move it to its fully extended position, as shown in FIG. 7, and to its fully retracted position, as shown in FIG. 1. As the telescopic rods extend past mid-length of the cow 2, the animal retrieving frame advances and starts pulling the weight 8 up by the cable 9 which is secured at its forward end to a hinge assembly 52' which moves the roller support frames 53 inwardly and biased with the 30 lbs weight. Each of the roller support frames 53 are now biased inwardly and move up along opposed sides of the body 2' of the cow from the rear to the neck of the cow. This biased force of 30 lbs is very light and does not hurt the animal. The telescopic rods 51 are extended in a slow motion movement until the body contacting cylinder rolls 27 reach the neck area of the cow, as shown in FIG. 8. At this position the tether locking mechanism is also deactivated, as will be described later. The cow is now engaged and ready to be retrieved. In order to retrieve the cow the telescopic side rods 51 are withdrawn slowly causing the cow to back-up onto the displaceable floor 17. At this position a job function can be effected to the cow as it is retained by the cage and the body contacting cylinders 27 which are in a shut position, as shown in FIG. 7, about the neck of the cow but retracted wherein the cow is maintained in the cage. It is pointed out that after the cows have been handled by the machine several times, the cow becomes accustomed to the machine and the retrieving arms and will move with the slightest of pressure into the cage almost automatically.

As shown in FIG. 4 and the embodiment of FIG. 10, an automatic robotic milking machine 60, of a type well known in the art, and manufactured by several companies, can automatically connect to the tits of the utter of the cow and milk the cow and sterilize itself. Conduits 200 will deliver the milk to a milk distribution pipeline 201. The quality of the milk can also be tested automatically in the platform assembly and if of acceptable quality, fed to the distribution pipeline 201. As shown, a long hose 202 is conveniently supported by a head rail 203. The quantity of milk being delivered by the cow is automatically inputted into the controller 15 with the cow's identification. The milking machine 60 is movable by piston cylinders 205 between the back legs of the cow. The section heads 206 are extended one at a time to connect to the tits of the utter to extract milk therefrom. After the milking operation is terminated, the machine retracts and sterilizes itself. After the job function is terminated, such as milking, the controller 15 causes the cylinder 56 to withdraw its piston rod 57, which has a finger 57' at its top end, to restore the torsion spring 52' to cause the roller support frame 53 to hinge out as well as the body contacting cylinder rolls 27. The cow 2 can then freely exit the cage and is urged to do so by a small pulling force on its collar by a tether cable 70 (see FIG. 8). After repeated use, the cow will instinctively leave the cage to go to its stall and therefore the tether may not be necessary.

Figure 9:
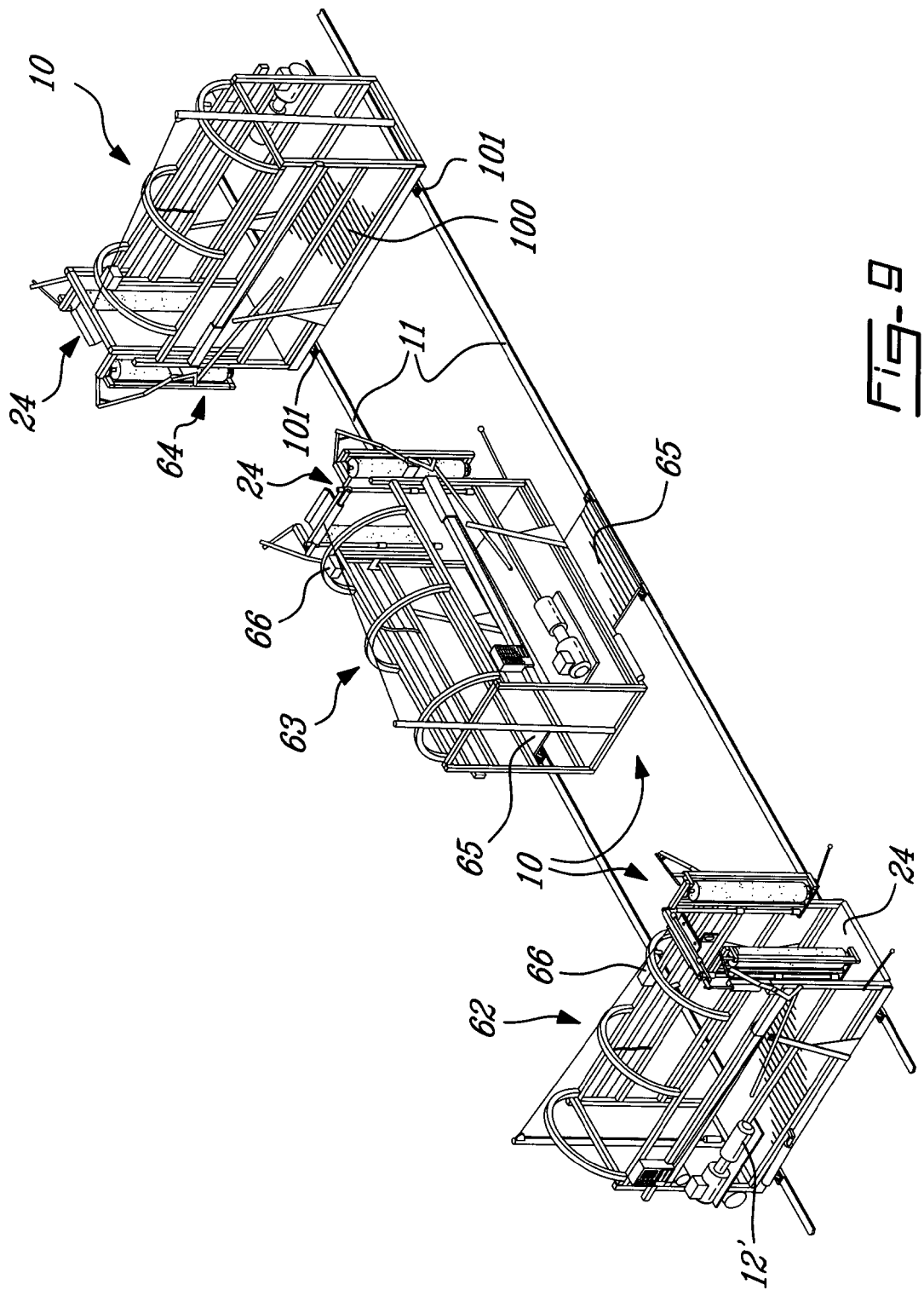
FIG. 9 is a perspective view showing the animal retrieving platform assembly displaceable on a pair of tracks and orientable at different positions whereby to effect different job functions to a domestic animal restrained therein and to retrieve a domestic animal therein from stalls located on opposed sides of the track.
Figure 11:
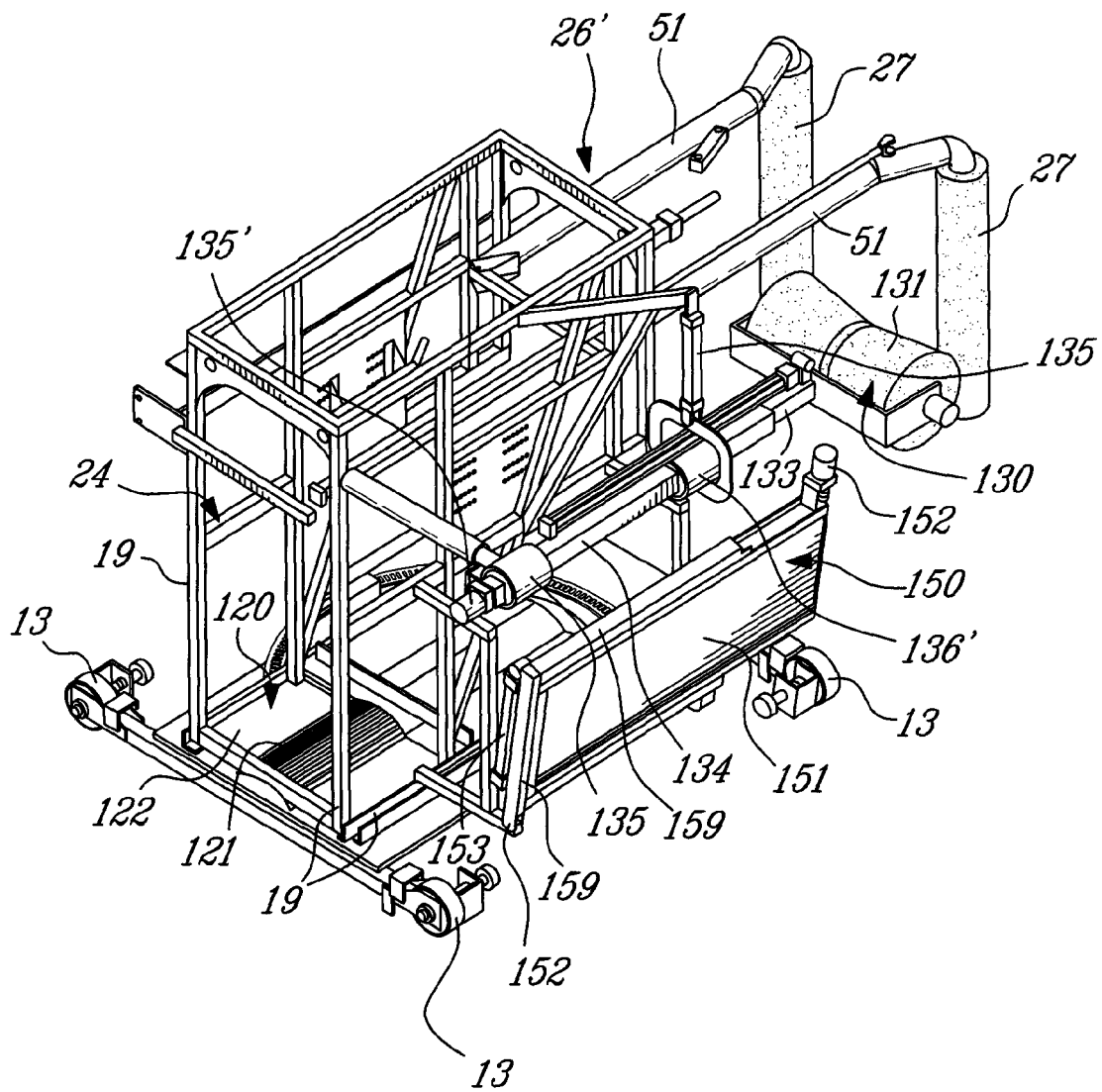
FIG. 11 is a rear perspective view of FIG. 10 with the exercising platform in a stored pivoted position.
Figure 12:
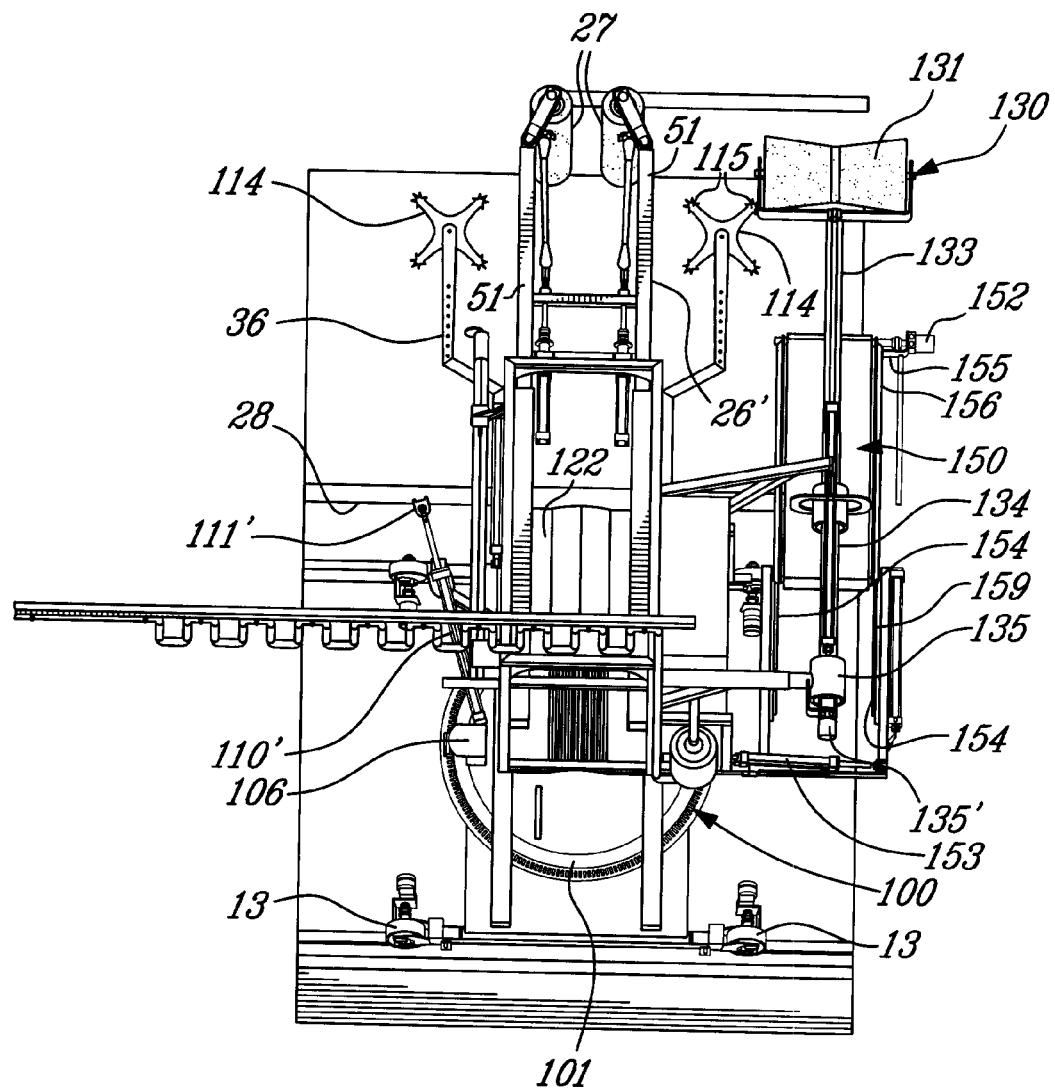
FIG. 12 is a top view, but with the exercising platform fully extended as well as the retracting arms and platform.

With reference to FIG. 9, it can be seen that the animal retrieving platform assembly 10 may be positioned at different positions along the tracks 11 and it is therefore provided with a rotational support assembly 100, as shown in FIGS. 10 to 12. It comprises a circular track 101 having gear teeth 102 disposed all along the track. The gear track 101 is secured to a support steel plate 103 secured to the undercarriage 14. The floor assembly 17 (FIG. 1) and 17' (FIG. 10) is supported on motor driven toothed wheels 104 driven by the motors 105 and secured to brackets 106 welded to the floor support frame 107. By controlling the motors 105 the platform assembly can be positioned axially along the set of tracks 11, as identified by reference numeral 62, or transversely thereof as indicated by reference numeral 63, in FIG. 9. The entrance opening 24 may also be positioned on opposed sides of the tracks such as shown at positions 62 and 64 to service opposed stalls. When the cage is positioned axially, as shown at position 63 with a cow restrained in the cage thereof, a temporary platform 65 may be positioned on opposed sides of the cage whereby to permit a person to file the hoofs of the cow which is necessary for its well being. Of course with the cow restrained in this position there is ample working area around the cage to permit a person to effect various job functions to the animal.

The controller 15 is hereinshown in the form of a panel secured to the cage and this permits the operator to operate various devices associated with the cage when the cage is at any of the positions as shown in FIG. 9. As previously mentioned, the controller can also be controlled at a remote location by a PC and through wireless communication whereby to operate the platform assembly, see FIG. 18. A camera 66 may also be mounted at the front end of the cage and be automatically remotely controlled to effect supervision of various operations and to monitor the position of the cow in its stall prior to actuating the displaceable floor. If the cow is, for example, lying down, then a telescopic arm 110' with an electric tip 111', as shown in FIGS. 10 and 12, may be advanced to pinch the cow to give it a light electrical shock to cause the cow to rise. If the cow does not rise then the platform assembly will move on to the next stall but a message or an alarm is transmitted to indicate that the cow may need to be attended to quickly in the event that the cow is sick or to remedy the situation.

Referring now to FIGS. 15 to 15B, there is shown one embodiment of the extendible tether for use with the embodiment of FIGS. 1 to 9 where the animal needs to be displaced a far distance from its stall. As herein shown the extendible tether is constituted by a flexible cable 70 which is secured to an end of the chain 31 which is attached to the neck collar of the domestic animal. The tether 70 is guided by guide flanges 71 and pulleys 72 into an elongated vertical tube 73 and secured at a lower end thereof to a weight 74. A tube 73 is secured adjacent each of the stalls. The weight 74 is of cylindrical shape and is displaceable up and down inside the vertical tube 73 by the tether being pulled out or being guided back into the tube as the cow leaves the stall and comes back into the stall after having been milked.

In order to prevent the cow from exiting the stall when the platform assembly is not in position to retract the cow therein, there is provided arresting means to prevent the weight 74 from being pulled upwardly within the tube. As shown in these Figures, the arresting means is constituted by a pivoting finger element 75 secured to the end of an actuator rod 76. The rod 76 is provided at an upper end thereof with an actuating spring-biased arm 77. The arm is secured to a spring 78 which pulls it in the direction of arrow 79 thereby causing the pivotal finger 75 to be biased inside an opening 80 provided in the vertical tube 73 above the weight 74 when the weight is at a lower end of the vertical tube 73 with the tether retracted. In order to release the tether the platform assembly is provided with a pusher element 81, see FIG. 15, which is secured to the cage and actuated to push the arm 77 whereby to axially rotate the actuator rod 76 to displace the pivoting finger 75 outside the opening 80 as shown at 75' in FIG. 15B. After the cylinder rolls 27 are retracted the domestic animal returns to its stall and the cylinder rod 82 is retracted to release and reposition the finger 75 inside the tube 73 above the weight 74. This weight is selected to apply a slight tension on the tether to urge the cow to return to its stall. Once the pivotal finger is in its engaged position inside the opening 80 the weight 74 can no longer be pulled up into the vertical tube 73 past the pivotal finger. FIG. 15 illustrates the tether in both its normal position "N" as well as in a slightly extended position "X".

Referring now to FIGS. 16 to 16C, there is shown a further embodiment of the extendible tether mechanism and more particularly of the actuator which is herein provided by an actuator cable 85 which is connected at an upper end 86 to a pivoting link arm 87 secured to a support arm 88. The lower end of the actuator cable 85 is secured to a rear extension portion 90 of the pivoting finger element 89. The opposed end of the finger element 89 has a projection 91 which faces the opening 80 in the vertical tube 73. The finger element 89 is secured by a pivot 92 connected to a pair of flanges 93 welded to the vertical tube 73 above the opening 80. In its normal position of rest, the pivotal finger element 89 is in an engaged position as shown in FIG. 16A with the arresting portion 91 of the finger element biased inside the opening 80 to prevent the weight 74 from being pulled up.

In order to release the tether 70 pusher element 81 is displaced against the pivotal link extension arm 87' causing the pivotal link to pivot downwards in the direction of arrow 95 pulling on the cable 85 and thereby retracting the pivotal finger element 89 out of the opening 80 as shown in FIGS. 16B and 16C. As soon as the cow reaches the cage, the pusher element 81 can be retracted and the finger will project inside the tube 73. When the weight descends it will pivot the finger out of the opening and when it passes the finger, the finger will automatically hinge inside the tube to arrest the weight.

With reference now to the second embodiment as illustrated in FIGS. 10 to 13E, there is shown generally at 10' a second embodiment of the automatic animal retrieving platform assembly of the present invention. As herein shown, the floor assembly 17' has a displaceable frontal floor section 120 which is displaceable forwardly, as with the embodiment described in FIG. 1, but is of a length to only receive the rear end portion of the cow. Accordingly only the back feet of the cow and its body to about mid-length, is in the cage. The displaceable floor 120 has a dome-shaped central portion 121 which guides the feet of the cow on the respective side of the dome. This causes the cow to spread its rear legs to provide access to the utter. Each side of the central portion 121 is provided with rubber matting 122 to provide good footing. The rear end portion of the floor section 120 is provided with a scraper 123 which is displaceable forwardly of the floor 120 by suitable displacement means to scrape the floor 120 of any animal deposits or other debris and push it in the gutter 28 behind the stall of the cow, as illustrated in FIG. 4. The scraper 123 is displaced by a piston or endless screw mechanism, not herein shown but obvious to a person skilled in the art, and is synchronized with the operation of the platform assembly 10'.

As also illustrated in the embodiment of FIGS. 10 to 12, the extendable retrieving mechanism 26' is provided with a piston operated displaceable mechanism to displace the cylindrical rollers 27. As herein shown, the telescopic rods 51 are retained in casings 110 and are coupled to hydraulic cylinders or pneumatic cylinders 111 to cause the rollers to move in and out of the casings 110, only one being shown in FIG. 10. The rollers 27 are further pivotally secured to a support arm 112 which is pressure biased towards one another in the direction of arrows 113 when the telescopic rods 51 extend out of their casings 110 and apply a slight pressure on the animal, as previously described. Also, the guide arms 36 are herein provided with a pivoting star-shaped support 114 provided with gear-shaped wheels 115 at the outer end thereof to engage with the cow on opposed sides thereof to guide the cow centrally of the entrance opening of the cage prior to the advancement of the guide rollers 27. These guides 114 impart a light touching sensation on the animal's body when contacted and at the same time pivot. This causes the cow to move sideways and automatically align itself.

As illustrated in the embodiment of FIGS. 10 to 13E, this embodiment provides for an exercising endless belt assembly 150 supported on a frame 159 which is pivotally connected at a lower end 152 to the frame members 19 of the cage. This exercising platform 150 is provided with an endless belt 151 which is driven by a controllable motor 152 to vary the speed thereof. The exercising platform 150 is also slidingly mounted in the frame 159, see FIG. 12, when lowered to a position of use by a piston 153. The exercising platform 150 is supported between opposed guide channels 154. The motor 152 causes the platform to advance and retract. The platform 150 is advanced slowly to position it under the legs of a cow which was released from the cage after milking. While the cow is exercised, the cow in the adjacent stall has been retrieved in the cage and is being milked. This process usually lasts from 6 to 8 minutes. Another motor is provided to move the endless belt to exercise the cow. However, with such an arrangement, support legs 155, or rollers, may be secured at the front end of the platform, to support the belt above a ground surface. It is also contemplated to position a scale under a support plate (not shown) under the endless belt to weigh the cows and feed this information to the control unit which stores this information in relation to the specific cow weighed.

While the cow is walking on the platform 150, a brush assembly 130 is placed in operation. The brush assembly 130 is comprised of a large brush 131 having a concave shape, as herein illustrated, and supported on a fork 132 secured to the front of a telescopic arm 133. The arm 133 extends in a cylinder 134 the position of which is variable and adjustable by a support piston cylinder 136 and axially rotatable sleeves 136'. This telescopic arm 133 as well as the support piston cylinder 136 and the axially rotatable sleeves 136' permit the brush 131 to be oriented at different positions to brush the back, sides and rear of a cow's body.

Figure 13A:
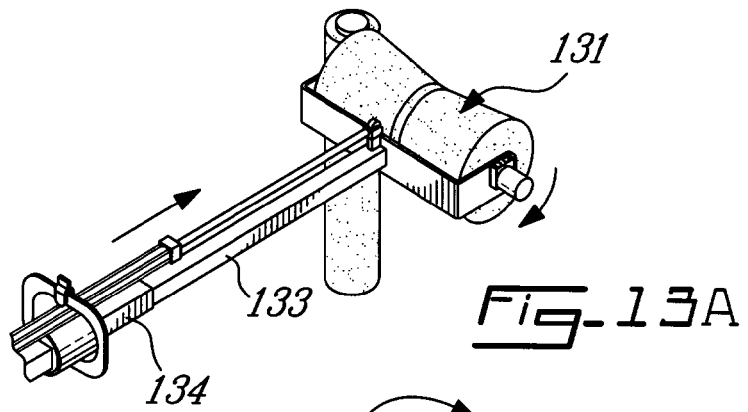
FIG. 13A is a fragmented perspective view showing the brush arm fully extended.
Figure 13B:
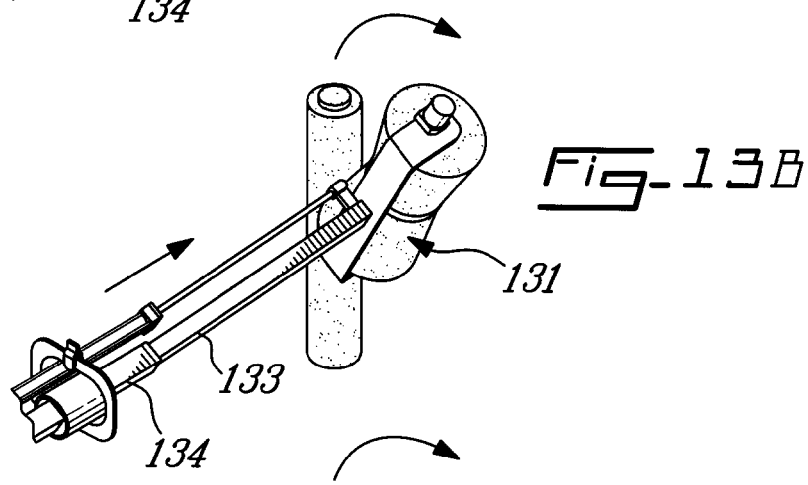
FIG. 13B is a fragmented perspective view showing the brush head tilted right.
Figure 13C:
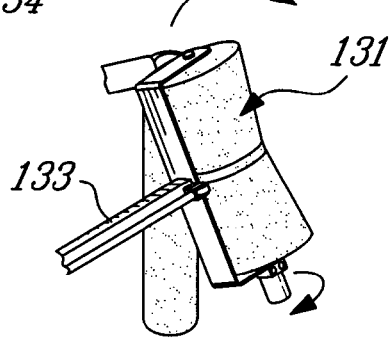
FIG. 13C is a fragmented perspective view showing the brush head tilted left.
Figure 13D:
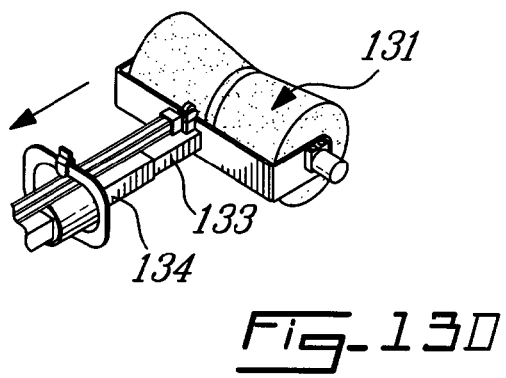
FIG. 13D is a fragmented perspective view showing the brush arm fully retracted.
Figure 13E:
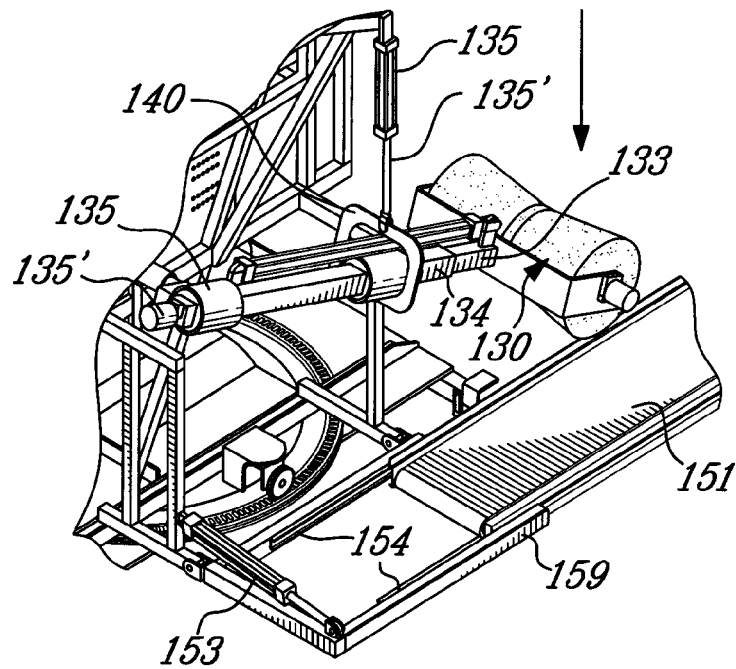
FIG. 13E is a fragmented perspective view showing the brush fully retracted and lowered.

FIG. 13A illustrates the brush assembly 130 with the telescoping arm 133 fully extended to a position behind the neck of the cow. The brush 131 is then operated while being retracted to brush the hair of the back of the cow. The brush 131 is then rotated to one side of the cow's body, as shown in FIG. 13B, and then to the other side as shown in FIG. 13C, and again the telescoping arm is retracted to effect a brushing action on both sides of the cow's body. Several strokes are needed to brush the entire side and back of the cow and this is accomplished by lowering the front end of the cylinder 134 piston rod 136" of piston 136, see FIG. 13E. Accordingly, the complete sides of the cow's body can be brushed. To brush the rear end of the cow's body, the brush is again placed horizontal, as shown in FIG. 13A, and lowered along the rear end body portion of the cow.

If the cow needs to be exercised then the endless belt 151 is operated slowly and the speed can be modified and this is particularly useful in winter months when the cow does not go out to pasture but remains in its stall. The endless belt 151 may also have an abrasive surface to clean and abrade the hoofs of the cow, as previously mentioned. This is also recommended for the well being of the cow. The endless belt 151 of the conveyor platform may also have an abrasive outer surface whereby to provide secured tractions to the hoof of the animal walking thereon. The abrasive surface is also selected to lightly sand the hoofs of the animal making them more comfortable to the animal. Again, it is emphasized that a well cared for cow will provide more milk and have a longer life expectancy thereby providing a better return on the investment to its owner.

It is further pointed out that the embodiment of FIGS. 10 to 12 is not solely restricted to receive a rear end portion of the cow in its cage but if a cow needs to be transported to another stall or elsewhere along the tracks, the animal is simply made to back up entirely within the stall with the rear legs of the animal positioned on the back side of the scraper plate 123.

As shown in FIG. 10, the displaceable floor 17' is herein provided with a pivotal floor plate 190 to provide a bridge between the front end 17" of the floor 17'. With this pivotal plate arrangement, the displaceable floor only projects partway across the gutter 28 and stops about 8 inches short from the gutter back wall. The plate 190 bridges the 8 inch gap. Therefore, if the cow has its back legs in the gutter, it will climb back into the stall when the plate 190 touches its rear legs. The plate is only displaced with a very light piston force not to hurt the cow's legs if they are in the gutter.

Figure 14:
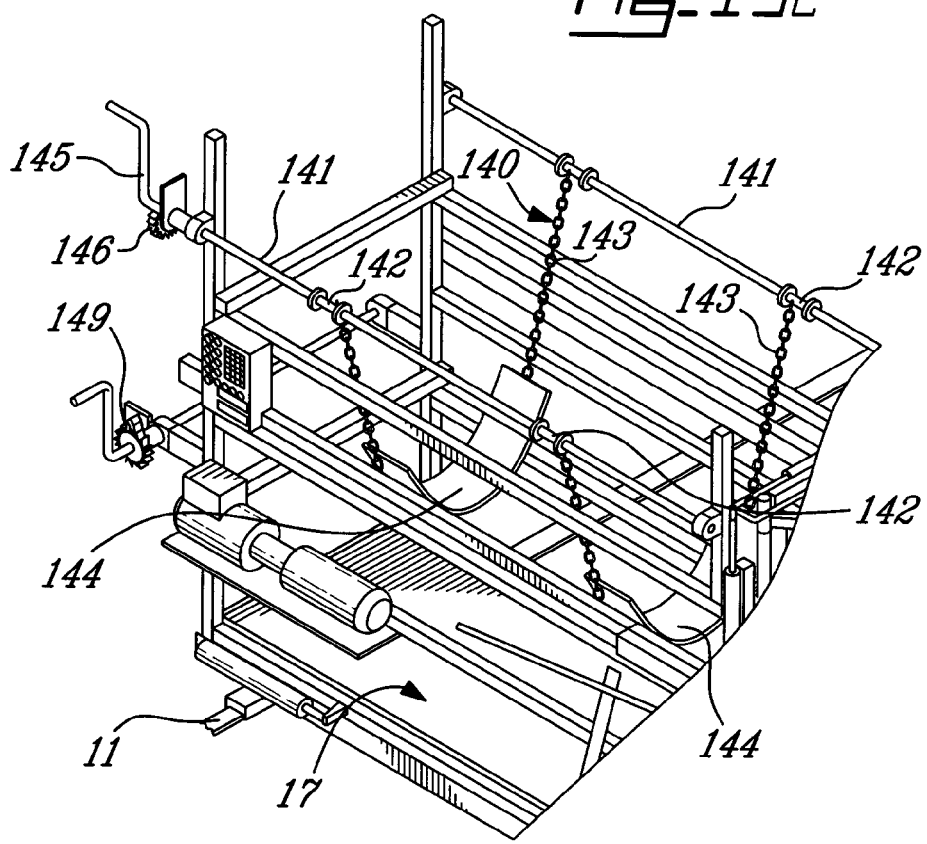
FIG. 14 is a perspective view to illustrate that the cage of the animal retrieving platform can also be provided with animal support straps to maintain the animal upright for inspection.

Referring now to FIG. 14, there is shown another adaptation wherein the cage is provided with adjustable strap arrangement 140 which is comprised of a pair of rotatable support rods 141 to which is secured a pair of sheaves 142 each receiving a cable or chain 143 which is secured at the end of a respective one of support straps 144. These support straps 144 are used to maintain an animal upright within the cage for inspection by a veterinarian or for other useful purposes. The support rods 141 are coupled to a crank arm 145 which rotates a gear 146 provided with a latch (not shown) to engage the gear teeth to prevent the rods 141 from counter rotation. Only one crank is herein shown but another crank would be coupled to the other rod 141. A further winch assembly 149 may also be provided to assist in the conditioning of the hoofs of a cow. This winch 149 is used to secure the foot of the animal in order to support the leg of the animal while the hoof is being filed or otherwise treated.

Briefly summarizing the method of operation of the animal retrieving platform assembly 10 and 10' of the present invention, it consists of displacing the platform assembly 10, 10' on a pair of tracks 11 to a predetermined location adjacent a rear end of a stall 29 (see FIG. 4) containing a domestic animal 2. The displaceable floor 17 is actuated to extend a predetermined distance behind the stall over the gutter area whereby to provide a bridge over the gutter for the animal to back-up onto the platform assembly 10 and more specifically the displaceable floor 17 which has been extended. The retrieving mechanism 26 is then actuated as well as the body contacting cylinder rolls 27 to position and engage with the body of the cow 2 on opposed sides thereof and to position the cylinder rolls 27 in the neck area of the cow. The retrieving mechanism is then retracted towards the cage causing the cow to slowly back up into the cage whereby a job function can be effected such as a milking operation while the cow is retained by the cylinder rolls 27.

Alternatively, it is conceivable that the displaceable floor 17 can be retracted with the cow 2 entirely in the cage and the displaceable platform assembly pivoted to orient it along the longitudinal axis of the tracks 11, as shown in FIG. 9. This provides better access to the cow 2 on opposed sides thereof to effect a job function to the cow such as the conditioning of its hoofs, etc., or an inspection by a veterinarian. It is also pointed out that the platform assembly 10 may be used to simply displace a domestic animal, such as a cow, from one stall to another stall or to another location. Therefore, the platform assembly can be used as a transport vehicle.

Figure 17:
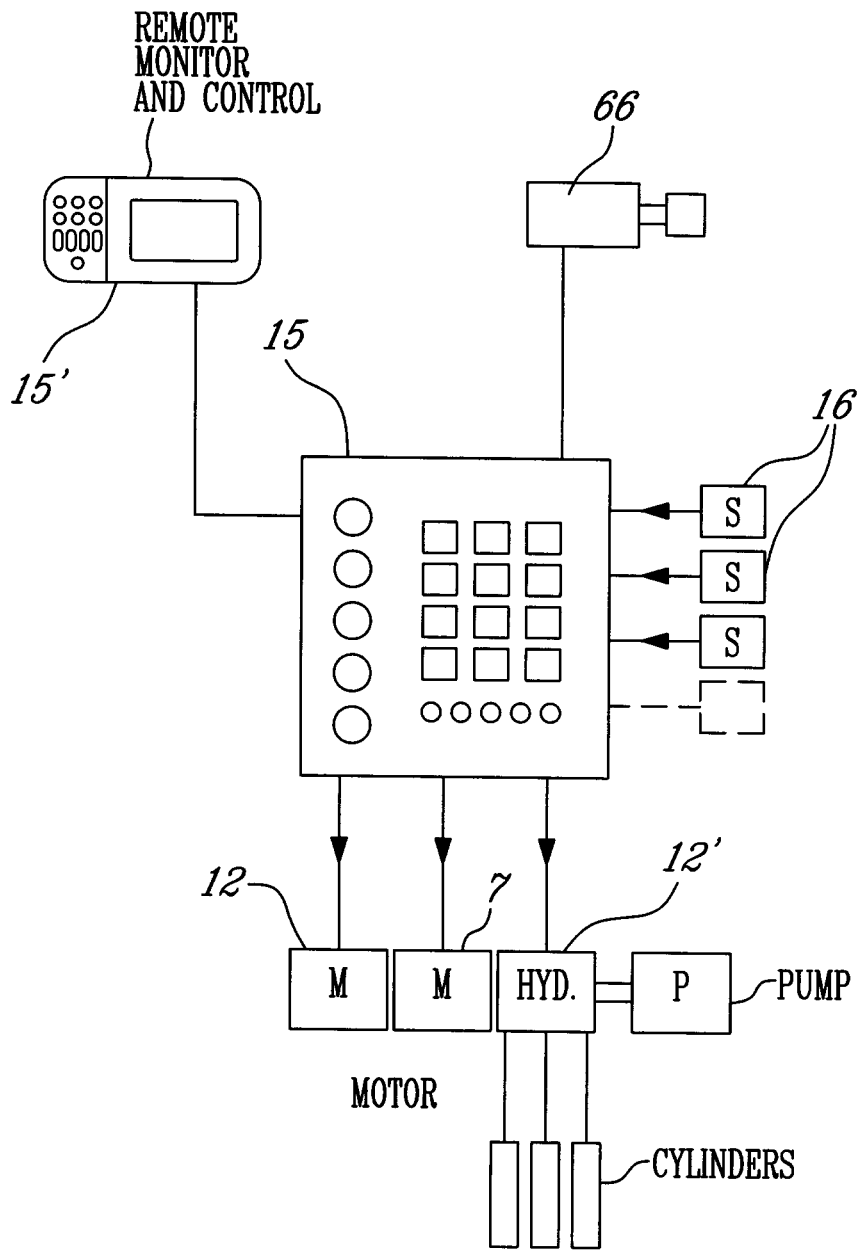
FIG. 17 is a simplified block diagram of a typical controller system.

As shown in FIGS. 10 to 12, the exercising platform 120 which has an endless driven belt provides an exercise machine for a domestic animal to cause it to walk on the conveyor platform to exercise the animal. This operation can be effected inside another platform assembly controlled automatically from a remote location by the use of cameras 66 without local human supervision (see FIG. 2), as previously described. Appropriate sensors are also provided to detect any malfunction of the apparatus or to detect any problems with the domestic animal retained in the stall or the cage. An alarm condition may also cause the termination of an operation until an attendant verifies the malfunction and resets the controller. The control system of FIG. 17 is a simple schematic diagram but it is to be understood that it comprises complex interacting circuits and devices to form a programmable system. It interacts with detectors to detect the presence of a cow in a stall and its position, i.e. standing or lying down, and interfaces with the telescopic arm to engage the electric tip 111' with the cow's body to impart a small electric shock giving a signal to the cow to rise. The displacement and all job functions of the displaceable platform assembly 10, 10' is controlled automatically by the control system and interface device(s).

It is within the ambit of the present invention to cover any obvious modifications of the embodiment described herein, provided such modifications fall within the scope of the appended claims.

The invention claimed is:

1. An automatic animal retrieving platform assembly for automatically retrieving and at least partly confining a domestic animal from a stall to effect a job function to said animal while at least partly confined on said animal retrieving platform, said platform assembly being automatically displaced by platform displacing motorized means and platform guide means and arrested to a location behind said stall, said platform assembly having animal confining means to receive at least a rear portion of the domestic animal, an opening associated with said animal confining means, extendible animal retrieving means secured to said animal retrieving platform and dimensioned to be extended in relation to the domestic animal occupying a stall with said opening facing a rear open end of said stall and said rear portion of the domestic animal, said extendible animal retrieving means confining and contacting a body portion of said domestic animal while permitting self-motion of said animal, said extendible animal retrieving means applying a retrieving force on said domestic animal to cause said domestic animal to slowly back-up into said opening and be at least partly confined by said animal confining means, said animal retrieving platform remaining arrested behind said stall until said job function is completed on said animal retrieving platform and said animal has returned to said stall.

2. An automatic animal retrieving platform assembly as claimed in claim 1 wherein said extendible retrieving means comprises spaced-apart extendible arms each said extendible arm being adapted to extend for retrieval contact with a frontal body portion of said domestic animal when said domestic animal is standing upright.

3. An automatic animal retrieving platform assembly as claimed in claim 2 wherein said extendible arms have body contact means, said body contact means being positioned on a respective side of said frontal body portion and oriented by said extendible arms to contact said domestic animal from opposed sides thereof.

4. An automatic animal retrieving platform assembly as claimed in claim 1 wherein said extendible retrieving means has body contact means to engage a frontal body portion of said domestic animal from opposed sides thereof.

5. An automatic animal retrieving platform assembly as claimed in claim 2 wherein said extendible retrieving means are retrieved in unison.

6. An automatic animal retrieving platform assembly as claimed in claim 1 wherein said platform assembly has a displaceable floor.

7. An automatic animal retrieving platform assembly as claimed in claim 1 wherein there is further provided means to cause said animal to exit said platform assembly through said opening.

8. An automatic animal retrieving platform assembly as claimed in claim 3 wherein said body contact means of each said extendible retrieving means is constituted by a body contacting element oriented and biased for displaceable contact with a body portion of said animal from a side portion of said animal to said frontal portion, from opposed sides of said animal, as said extendible retrieving means is extended along opposed sides of said animal.

9. An automatic animal retrieving platform assembly as claimed in claim 6 wherein each said contact element is a contact friction cylinder roll, each said contact friction cylinder roll being arrested at a neck area of said domestic animal, said contact friction cylinder roll on opposed sides of said neck area maintaining a substantially constant pressure while said extendible retrieving means is retracted, said cylinder roll on each side of said domestic animal being retracted after said job function is completed to release said pressure from opposed sides of said neck area of said domestic animal whereby said animal freely returns to its stall directly in front of said opening, said opening being an entrance opening.

10. An automatic animal retrieving platform assembly as claimed in claim 9 wherein said contact friction cylinder roll is secured in a vertical orientation in a roller support frame.

11. An automatic animal retrieving platform assembly as claimed in claim 8 wherein said extendible retrieving means is constituted by a pair of telescopic rods secured to said animal confining means, said rods being secured to displaceable means to extend and retract same with respect to said confining means from opposed sides of said opening, said telescopic rods being secured at a front end thereof to a roller support frame.

12. An automatic animal retrieving platform assembly as claimed in claim 1 wherein said guide means is constituted by a set of tracks secured to a floor surface and disposed spaced behind a plurality of animal stalls disposed in side-by-side relationship, said domestic animals being milk-producing cows.

13. An automatic animal retrieving platform assembly as claimed in claim 10 wherein said platform assembly is supported on wheels displaceable on a set of tracks, at least some of said wheels being drivable wheels constituting said motorized means.

14. An automatic animal retrieving platform assembly as claimed in claim 6 wherein said animal confining means is constituted by rails secured elevated on opposed side edges and a rear edge of said displaceable floor which is a rectangular floor, a front edge of said floor being disposed across said opening.

15. An automatic animal retrieving platform assembly as claimed in claim 6 wherein said displaceable floor is secured to a floor frame and displaceable axially along a longitudinal axis thereof whereby to position a front edge thereof in contact with a rear floor portion of said rear open end of said stall.

16. An automatic animal retrieving platform assembly as claimed in claim 1 wherein said domestic animal is a cow, said job function being comprised by an automatic milking machine secured to said platform assembly and capable of connecting and disconnecting itself from an udder of said cow to extract milk therefrom.

17. An automatic animal retrieving platform assembly as claimed in claim 13 wherein said floor frame is secured to brackets having a drive motor coupled to a circular track secured under said platform assembly, said motor being controllably driven whereby to position said displaceable floor axially along said set of tracks or transversely thereof with said opening facing a selected one of said stalls on opposed sides of said set of tracks.

18. An automatic animal retrieving platform assembly as claimed in claim 6 wherein there is further provided lateral restraining arms secured to said animal confining means and automatically positionable on opposed sides of said domestic animal outwardly of said extendible retrieving means to assist said animal to position itself in alignment with said opening and to guide said animal during its displacement from said stall onto said displaceable floor.

19. An automatic animal retrieving platform assembly as claimed in claim 1 wherein said platform assembly is provided with one or more cameras and sensors, and a controller and interface circuit means to effect operation of said platform assembly.

20. An automatic animal retrieving platform assembly as claimed in claim 1 wherein said floor is provided with a displaceable floor plate at a front end thereof, said displaceable floor plate being adapted to bridge a gutter between said stall and said floor of said platform assembly.

21. An automatic animal retrieving platform assembly as claimed in claim 13 wherein sensor means is connected to a motor control means which controls motors to displace said displaceable floor, said sensor means arresting said motors upon detection of an obstructing force in contact with said front edge of said floor.

22. An automatic animal retrieving platform assembly as claimed in claim 1 wherein said platform assembly is further provided with a control panel to effect operation thereof.

23. An automatic animal retrieving platform assembly as claimed in claim 2 wherein said displaceable floor in at least a front portion thereof adjacent said opening is provided with a dome-shaped central portion whereby to guide at least the rear feet of a domestic animal to spread to provide access to an utter of said domestic animal.

24. An automatic animal retrieving platform assembly as claimed in claim 2 wherein there is further provided a scraper element supported for scraping contact with said displaceable floor and displaceable towards a front end of said floor to scrape said floor of animal deposits or other debris and discharge same at said opening.

* * * * *